United States Patent [19]

Olsen

[11] 4,235,156
[45] Nov. 25, 1980

[54] DIGITAL SERVOVALVE AND METHOD OF OPERATION

[76] Inventor: Zenny Olsen, Southington, Conn.

[21] Appl. No.: 961,251

[22] Filed: Nov. 16, 1978

[51] Int. Cl.[3] ............................ F15B 9/03; F15B 9/09
[52] U.S. Cl. .................................... 91/363 R; 91/467
[58] Field of Search ..................... 91/361, 362, 363 R, 91/363 A

[56] References Cited

U.S. PATENT DOCUMENTS

| | | | |
|---|---|---|---|
| 3,457,836 | 7/1969 | Henderson | 91/380 |
| 3,516,333 | 6/1970 | Jackson | 91/380 |
| 3,555,967 | 1/1971 | Geyer | 91/368 |
| 3,621,762 | 11/1971 | Yolkebe | 91/503 |
| 3,664,234 | 5/1972 | Simon et al. | 91/363 R |
| 3,695,295 | 10/1972 | Olsen et al. | 137/625.69 |
| 3,800,667 | 4/1974 | Ponter | 91/380 |
| 3,899,956 | 8/1975 | Olsen | 91/368 |
| 4,070,604 | 1/1978 | Usry | 318/696 |
| 4,106,390 | 8/1978 | Kodaira et al. | 91/361 |

Primary Examiner—Paul E. Maslousky

[57] ABSTRACT

A digital servovalve control system employs a stepper motor to rotate the input shaft of a servovalve. The servovalve has no feedback shaft; feedback in the control system is provided exclusively by a digital encoder connected to the load output to indicate changes in its position. The encoder output is compared with a command signal in a digital controller circuit that generates and transmits pulses to the stepper motor in response to the difference between the command and feedback signals. The control system includes means for keeping track of the null position of the servovalve so that the digital controller can always accurately respond to the signals it receives.

The servovalve used with the control system includes a valve spool that rotates with rotation of the input shaft, thereby providing a wiping action only afforded in the prior art by rotation of a feedback shaft.

6 Claims, 8 Drawing Figures

DIGITAL SERVOVALVE AND METHOD OF OPERATION

BACKGROUND OF THE INVENTION

The present invention relates to servovalves and control systems used in connection with them. As described below, the system is particularly applicable to hydraulic systems; however, those skilled in the art will recognize that the principles applied below are also applicable systems employing compressible fluids.

Many control systems employ hydraulic circuits and hydraulic motors for control of the object system. The power supply in such systems is normally in the form of some type of pump, but the application of power is controlled by the servovalve, which controls the rate, including direction, of hydraulic-fluid flow. The servovalve is thus the interface between the hydraulic system and the previous link in the control chain, whether the previous link is electrical, mechanical, fluid, or of some other type. As in other areas of control systems, the recent availability of digital logic devices, their ease of application, and their repeatability provide impetus for the control-system designer to employ digital technology in as much of his system as possible.

An example of attempts to apply digital technology to control systems involving servovalves is U.S. Pat. No. 3,621,762 to Yo Ikebe. Yo Ikebe teaches the use of a stepper motor to position the operating member of a servovalve, pulses to the stepper motor being produced by a variable-frequency oscillator that is controlled by a reversible counter. In this arrangement, control signals that are digital in form can be applied to the reversible counter. The command information to the system is thus in digital form. This Yo Ikebe arrangement illustrates a step that has been taken toward making the servovalve system digital, but it also illustrates that servovalve control systems have heretofore been hybrid at best; none can be considered to have been totally digital.

Some of the drawbacks present in control systems heretofore used with servovalves inhere in the servovalves themselves. Ideally, a given position of the input shaft on a servovalve should consistently result in a null, or no-flow, position of the operating member of the valve. Experience has shown that this ideal is never reached, and it is only approximated with some difficulty and expense. Due to factors such as temperature changes and wear, the no-flow position of the operating member of the valve tends to vary, resulting in an offset in the control system and a consequent lack of precision. In light of this consideration, considerable expense and effort are expended during manufacturing to eliminate variation as much as possible. Even with a great deal of expense, however, variation is not completely eliminated; it is only reduced with a concomitant increase in cost.

Accordingly, it is an object of the present invention to employ in servovalve control systems the digital technology presently available to as great of degree as possible. This object is achieved by employing the teachings of the present invention, which additionally result in an arrangement that permits avoidance of much of the manufacturing expense presently incurred in eliminating the variation in no-flow position.

SUMMARY OF THE INVENTION

According to the present invention, a digital feedback control system for controlling a load whose output is controllable by flow of fluid through it includes servovalve means. A valve operating member is movable within the servovalve means. Fluid circuit means are provided that are adapted for connection both between a source of pressurized fluid and the servovalve means and between the servovalve means and the load. The fluid circuit means provide fluid communication between the source of pressurized fluid and the servovalve means and between the servovalve means and the load. The rate and direction of hydraulic flow through the servovalve means and thereby through the load is dependent on the position of the operating member in the servovalve means. Stepper motor means are operatively connected to the valve operating member to change the position of the valve operating member by steps in response to pulses applied to the stepper motor means. Digital feedback means adapted to be connected to the hydraulic load are provided to sense changes in the output of the hydraulic load and generate digital feedback signals indicative of changes in the load output. Digital controller means adapted to be connected to a source of digital command signals indicative of a desired load output are connected to the digital feedback means for reception of the digital feedback signals. The digital controller means determine the actual load output from the feedback signals, compare the actual load output with the desired load output, and generate and apply to the stepper motor means signals to position the valve operating member. The signals are applied to the stepper motor means, in response to the difference between the actual load output and the desired load output, for flow of fluid through the load to reduce the difference between the actual load output and the desired load output.

The valve operating member is typically movable to a null position in which it prevents fluid flow in the servovalve. The digital controller means preferably includes position-storing means for storing a digital number, monitoring the step signals generated and applied to the stepper motor means by the digital controller means, and incrementing and decrementing the digital number in accordance with the signals applied to the stepper motor means by the digital controller means. The position of the valve operating member is represented by the digital number, with a predetermined null valve of the digital number representing the null position of the servovalve. The digital controller means include nulling means operable to monitor the digital feedback signals received by the digital controller means, to generate and apply to the stepper motor means signals for positioning the valve operating member to counter any changes in output indicated by the digital feedback signals, and to reset the position-representing digital number to the predetermined null value when no further changes in output are indicated by the feedback signals. The digital controller means generate and apply to the stepper motor means signals to cause the position-storing means to increment or decrement the stored digital number to equal the predetermined null value when the desired load output equals the actual load output, fluid flow in the fluid circuit means thereby being prevented when the actual and desired load outputs are equal.

It is advantageous in such a combination for the servovalve means to include a valve body having a valve chamber and a chamber wall bounding the valve chamber, at least one inlet port communicating with the chamber, and at least two control outlet ports communicating with the chamber and spaced along the chamber from the inlet port. A valve spool slidably and rotatably mounted axially of the chamber and having lands contiguous to the chamber walls regulates flow of fluid in the valve chamber between the inlet port and the control ports. Rotary-to-linear-translator means at one end of the valve spool include a first element on the valve spool for movement with it and a second element fixedly disposed in the valve body. Rotation of the valve spool and thereby of the first element relative to the second element produces concurrent relative axial movement of the first element and also of the valve spool relative to the ports. The stepper motor means would include an output shaft and would be operable, by application of pulses to it, to rotate the shaft in controlled steps, each step representing a controlled number of degrees of arc. Coupling means, connected between the stepper-motor-means output shaft and the other end of the valve spool, would couple rotation of the shaft to the spool but permit relative sliding movement of the other end of the spool relative to the shaft. Application of pulses to the stepper motor means thereby causes the spool to be rotated and slid in steps relative to the valve body. It therefore also causes the chamber walls to be wiped by rotation of the lands.

Preferably, one of the first and second elements of the rotary-to-linear-translator means includes a cylindrical member coaxial with the spool and having a helical groove. The other of the first and second elements of the rotary-to-linear-translator means includes a cam pin extending into the groove, rotation of the valve spool relative to the valve body causing relative movement of the cam pin and the helical groove to slide the valve spool axially of the valve body.

Specifically, the first element of the rotary-to-linear-translator means includes the cylindrical member with the helical groove, and the second element of the rotary-to-linear-translator means includes the cam pin.

Normally, the valve body also has at least two return ports, one associated with each of the control ports. Each of the return ports communicates with the chamber and is spaced along the chamber from its associated control port. The lands on the valve spool also regulate flow of fluid in the valve chamber from the return ports to their associated control ports.

Also according to the present invention, a method of nulling the digital feedback control system includes monitoring the digital feedback signals received by the digital controller means to detect any changes in output indicated by the digital feedback signals, generating and applying to the stepper motor means step signals for positioning the servovalve to counter any changes in output indicated by the digital feedback signals, and resetting the position-representing digital number to the predetermined null value when no further changes in output are indicated by the feedback signals, thereby insuring correspondence at the null position of the servovalve between the digital number and the null position of the servovalve.

BRIEF DESCRIPTION OF THE DRAWINGS

These and further features and advantages of the present invention are illustrated by reference to the attached drawings, in which.

DETAILED DESCRIPTION OF THE PREFERRED EMBODIMENT

The digital feedback control system of the present invention controls a load hydraulically. It would typically find application as a subsystem of a larger control system that would provide it with command signals indicating a desired output from the load. Position or velocity would be the normal output, and the load would be of the type that is controlled by the flow of hydraulic fluid through it. An example of such a load would be the ram of an injection molding machine or one of the positioning mechanisms in an x-y table.

Figure 1:
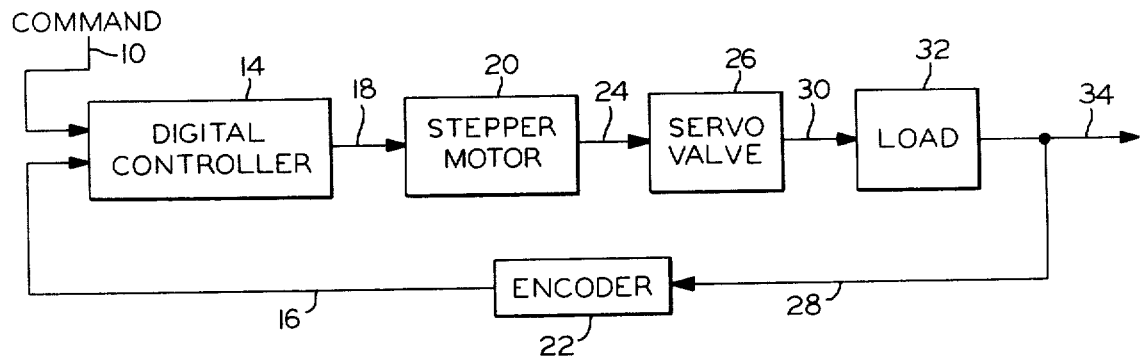
FIG. 1 is a block diagram showing the control system of the present invention.

The control system is shown conceptually in FIG. 1 connected to a load 32. A command signal arrives on line 10 that indicates the output that is desired. The intent of the control system is to cause the output, represented by line 34, to follow the input present on line 10. The load 32 is controlled generally by a servovalve indicated by block 26. The servovalve is connected between a source of pressurized fluid (not shown) and the load, and the amount of hydraulic fluid permitted to flow through the load is controlled by the position of an operating member that is movable within the servovalve. Control of the load 32 by the servovalve 26 is represented in FIG. 1 by line 30.

Line 24 represents the control of the servovalve 26 by a stepper motor 20, which is operatively connected to the operating member of the valve to change the position of the operating member in a stepwise fashion in response to pulses received by the stepper motor. The pulses fed to the stepper motor 20 are generated in a digital controller means, represented in FIG. 1 by block 14, and the transmission of the pulses from the digital controller 14 to the stepper motor 20 is represented by line 18.

Many of the advantages inherent in the system illustrated in FIG. 1 are derived from the fact that all signals, whether command, feedback, or error, are digital in nature. Toward this end, an encoder 22 is provided. Encoder 22 is a digital feedback means that is adapted to be connected to the hydraulic load and that senses changes in the output of the hydraulic load, generating digital feedback signals that indicate these changes. This function is indicated by lines 16 and 28 and encoder 22. The encoder 22 would typically be a position encoder of the type having a shaft that rotates with changes in the position of the load. Such an encoder would transmit pulses as the shaft rotates, and it would typically provide pulse outputs on two lines, each pulse indicating one unit of change in output. If no pulses are emitted, then there is no change in the output. A low-frequency pulse output indicates a low velocity, and a high-frequency pulse output indicates a high velocity. The purpose of having two output lines from the encoder is to provide information as to the direction in which the output is changing. A common method of indicating direction is to arrange the two pulse trains so that they are out of phase with each other, the relative phase of the two pulse trains indicating the direction of motion.

Of course, the encoder just described is merely exemplary. Those skilled in the art will be aware of many other types of encoders that also translate a physical position or velocity into digital signals.

The digital controller receives the command signal on line 10 and the feedback signal on line 16 and responds to the difference between the desired output indicated by the command signal and the actual output indicated by the signal on line 16 by generating and applying signals to the stepper motor to position the valve operating member in such a fashion as to bring the output of the load to the desired value.

Figure 2:
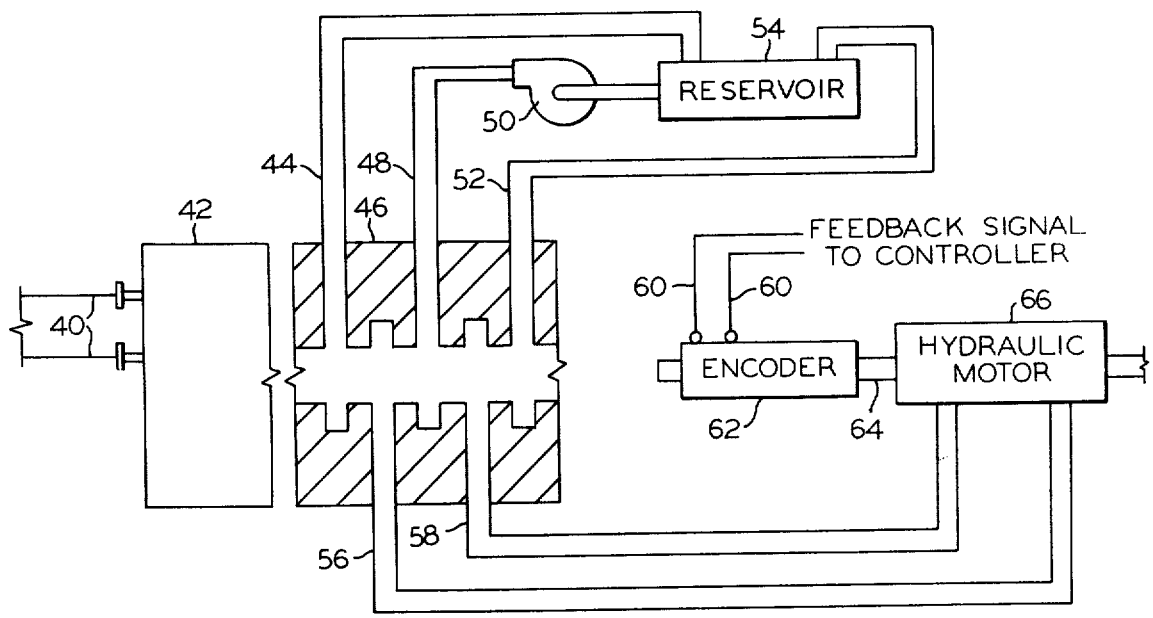
FIG. 2 is a somewhat more detailed, but still diagrammatic, rendering of the parts of the control system of FIG. 1 to the right of the digital controller.

The part of the apparatus represented by blocks 20, 22, 26, and 32, together with lines 16, 18, 24, 28, 30, and 34, is exemplified in FIG. 2 by a system in which a hydraulic motor—for instance, one of the type that is used to power an x-ray table—is controlled by the system of the present invention. A pump 50 and reservoir 54 serve as a source of pressurized fluid that is supplied to the hydraulic motor 66. The circuit taken by the hydraulic fluid includes conduit 48, which is the pressure or inlet line to a servovalve 46, conduits 56 and 58, which are conduits between control ports in the servovalve and the hydraulic motor, and conduits 44 and 52, which are return conduits from the servovalve to the reservoir 54. Depending on the position of the operating member in the servovalve 46, the hydraulic fluid may flow from pump 50 through conduit 48 and conduit 56 to the hydraulic motor 66 and back through conduit 58 and 52 to the reservoir 54. In the alternative, the hydraulic fluid flowing in conduit 48 from the pump 50 can flow from conduit 48 to conduit 58 to reach the hydraulic motor 66. The return path would then include conduits 56 and 44 instead of conduits 58 and 52, respectively.

The position of the operating member in the servovalve 46 determines the rate of flow as well as the direction.

The operating member is not shown in FIG. 2, but a stepper motor that positions it is indicated by reference numeral 42, which is shown having input lines 40 for receiving pulses. The stepper-motor shaft rotates in a stepwise fashion, rotating through a controlled amount and arc in response to each pulse received on lines 40. By means detailed below, the stepper-motor 42 positions the valve operating member to control the flow of pressurized fluid through hydraulic motor 66. Lines 16 and 28 and encoder block 22 of FIG. 1 are represented in FIG. 2 by shaft 64, encoder 62, and lines 60. Shaft 64 could be the hydraulic-motor shaft or some other mechanism whose position is related to the output in question. Encoder 62 is shown as having two output lines 60, which would be typical of the type of encoder previously described. Of course, if the encoder were of the type whose output is a digital number that represents position and is presented in parallel, more output lines would be required.

In summary of FIG. 2, a digital signal arrives at stepper motor 42 on lines 40, which correspond to line 18 in FIG. 1. In response, the stepper motor positions servovalve 46 to control movement of the hydraulic-motor shaft. As the shaft moves, a signal representative of changes in output is sent to the digital controller means on lines 60, which are represented in FIG. 1 by line 16.

It will be apparent from the foregoing part of the description that the term digital as used here is not restricted to signals that are digital in the positional sense of the term in which the quantity represented by a pulse depends on the position of the pulse, like digits in a binary number. The term as used here also includes signals such as those applied to the stepper motor, in which each pulse represents the same quantity. This type of signal has the characteristics of a digital signal that are important here; they represent discrete quantities, and they afford the repeatability associated with digital systems.

Figure 3:
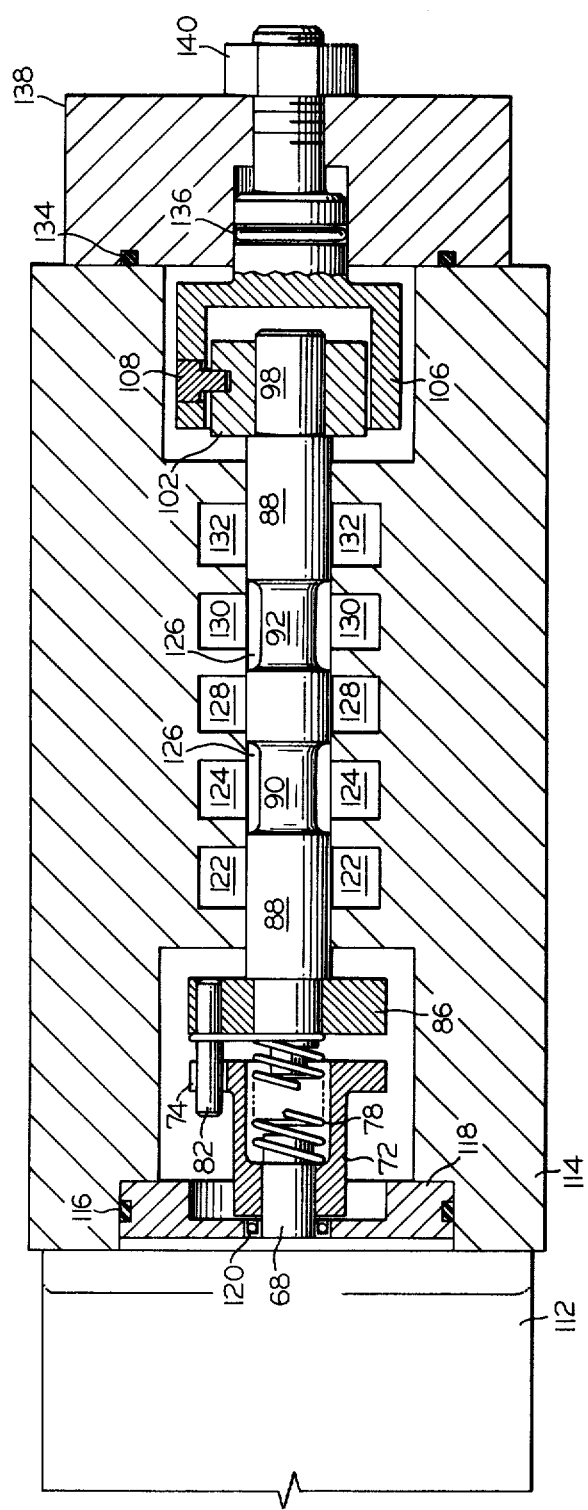
FIG. 3 is a cross-sectional view of a servovalve built according to the teachings of the present invention.
Figure 4:
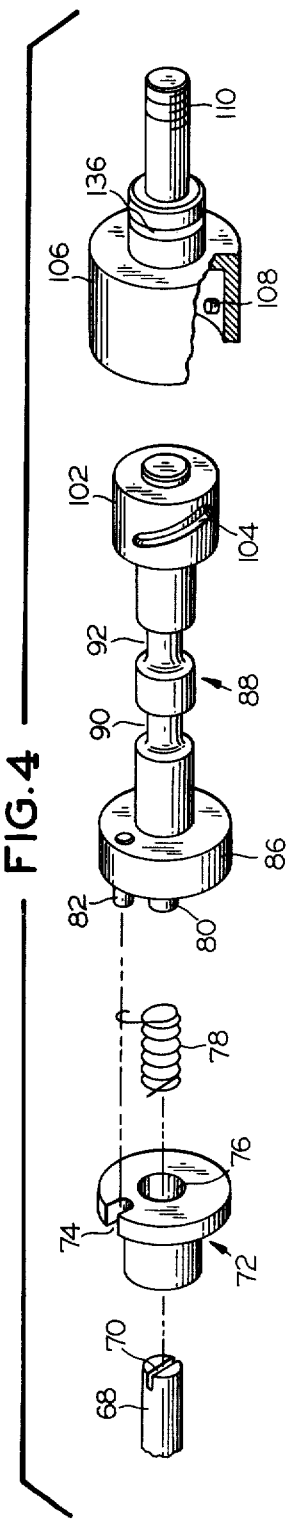
FIG. 4 is an exploded perspective view of the valve of FIG. 3 with the valve body removed.

Attention is now invited to FIGS. 3 and 4, which illustrate in detail a valve of the type that could be used with the present invention. A valve body 114 is hollowed to form a chamber 126. The valve operating member includes a spool 88 that is slidable along the axis of the fluid chamber 126. Lands on the spool contiguous to the walls of chamber 126 leave narrowed regions 90 and 92 that are thereby moved relative to various ports 122, 124, 128, 130, and 132 so as to control flow through the chamber between the ports. Port 128 is the pressure port, through which a source of pressurized fluid communicates with chamber 126. As shown in FIG. 3, however, spool 88 can be positioned so as to prevent completely the flow of hydraulic fluid from port 128 into the fluid channel. The ports 124 and 130 on either side of pressure port 128 are control ports that can also provide communication to the valve chamber 126. Control ports 124 and 130 are in communication with conduits, of the type represented by conduits 56 and 58 of FIG. 2, that are connected across a hydraulic load. The outermost ports 122 and 132 are return ports that provide communication between the chamber 126 and a reservoir such as reservoir 54 of FIG. 2.

It will be appreciated that axial sliding of spool 88 can align one or the other of the narrowed regions 90 and 92 with the pressure port 128. Depending on the direction of the sliding of the spool, the narrowed portion can be aligned either with control port 124 or control port 130 when it is aligned with pressure port 128. When one of the narrowed regions 90 and 92 is aligned with one of the control ports 124 and the pressure port 128, the other narrowed portion 90 and 92 will be aligned with the other control port 124 or 130 and its adjacent return port 122 or 132, respectively. Thus, it can be appreciated that, when there is fluid communication between the pressure port and one of the control ports, communication is also provided between the other of the control ports and is associated return port, thereby completing a hydraulic circuit when the servovalve is connected as shown in FIG. 2.

Linear positioning of the spool 88 is accomplished by rotation of stepper motor shaft 68 by the stepper motor 112. This causes the spool to rotate, thereby rotating an index cam 102 at the opposite end of the spool from the stepper-motor shaft 68. The stepper-motor shaft sits in a bore in a coupling member 72 and engages the coupling member to rotate it. A seal plate 118 first in a recess in the valve body 114 and is shaped to hold an O-ring 116 that fits between the seal plate 118 and the valve body 114. The stepper-motor shaft 68 is journaled in the seal plate 118, and an oil seal 120 fits between the seal plate 118 and the shaft 68. A slot 70 in the shaft 68 holds the free end of a spring 78, thereby preventing rotation of the spring with respect to the shaft. A second coupling member 86 having a center post 80 and another post 82 fits into the first coupling member 72, the center post 80 being received axially by the spring 78. A second free end of the spring engages post 82 of the second coupling member 86. Post 82 of the second coupling member 86 fits into a slot 74 in the first coupling member 72. Thus, rotation of the first coupling member 74 causes rotation of the second coupling member 86 due to the engagement of post 82 by slot 74. The spring biases post 82 to one edge of the slot 74, thereby preventing backlash when the direction of rotation is reversed.

The spool 88 is rigidly connected to the second coupling member 86, and the spool is narrowed at its other end to provide a narrowed region 98 that fits in the axial bore in the index cam 102, to which it is rigidly connected. The index cam 102 is a cylindrical member having a helical groove 104 formed in its circumferential surface. The groove is shaped to receive a cam pin 108 that is stationary with respect to the valve body. The cam pin 108 is held in place by an index coupling 106. Coupling 106 narrows to a sealing region that fits into a recess in an end cap 138, which is fastened to the end of valve body 114. The sealing region of index coupling 106 has a circumferential groove formed in it. The groove accommodates a seal 136 that seals the interface of the index coupling and the end cap 138. The end cap is also provided with an annular groove to accommodate an O-ring at the interface between the valve body 114 and the end cap 138. Adjustment of the postion of the spool 88 is accomplished by means of a nut 140 that threadedly engages a threaded shaft 110 on the index coupling 106.

As can be appreciated from the description of the servovalve, control of fluid flow between the various ports can be effected by rotation of stepper-motor shaft 68. Rotation of shaft 68 causes rotation of the spool 88, which is thereby slid along the fluid channel 126 due to the rotation of the cam 102 with respect to the cam pin 108. Index cam 102 and cam pin 108 thereby serve as a rotary-to-linear-translator. The universal coupler that includes coupling members 74 and 86 permits this axial sliding because coupling member 74 imparts rotation to coupling member 86 without preventing translation of coupling member 86 with respect to coupling member 74. Thus, providing pulses to the stepper motor causes the spool to rotate and thus slide axially to control the flow of fluid in the hydraulic circuit.

Since rotation of the stepper-motor shaft results not only in translation of spool 88 but also in its rotation, the valve of FIGS. 3 and 4 differs from conventional valves, in which input-shaft rotation results only in translation of the spool; rotation of the valve spool in a conventional servovalve only occurs when there is rotation of a feedback shaft. Rotation of the valve spool is desirable because it performs a more effective wiping of the chamber wall by the spool lands than mere sliding does, and rotation of the spool in response to input-shaft sliding is particularly advantageous in the digital valve because there is no feedback shaft by which rotation of the spool can be accomplished. Accordingly, the valve shown in FIGS. 3 and 4 is especially well suited to applications in which there is no shaft feedback.

Figure 5:
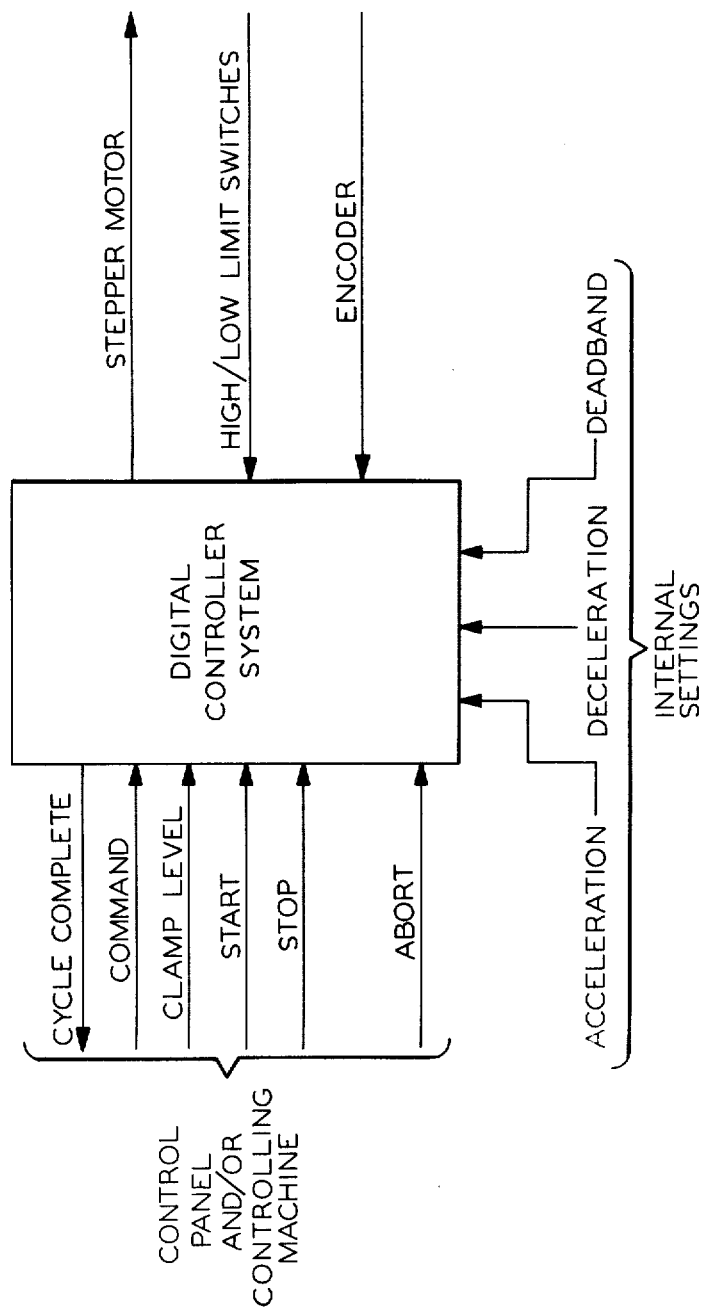
FIG. 5 is a diagrammatic rendering of some of the inputs and outputs that would typically be received and generated by a system that includes the system of the present invention.

As was indicated above, the control system of the present invention would typically be a subsytem of a larger control system. Accordingly, it would not be unusual for the circuits that embody the controller of the present invention also to include a number of other features. FIG. 5 represents by inputs and outputs some of the functions that could be included in a larger system that incorporates the controller of the present invention. The larger system could receive various inputs such as the command signal mentioned above from a control panel or higher-level controlling machine. A "clamp level" signal could be provided, as is indicated in FIG. 5, to assign a speed limit to the system if required by inertial or other characteristics of the load. The "clamp level" signal would indicate how wide the widest possible opening of the servovalve could be. Alternately, the system could directly measure the rate of change in position of the load and cause the controller to enforce the speed limit indicated by the clamp level.

The larger system could also include a memory that would store a sequence of steps through which the load is intended to be led. In such a case, the system would merely receive a "start" signal to begin the cycle contained in its memory. Such a system would typically also give a "cycle complete" signal to the control panel or controlling machine when the cycle had been completed.

In addition to requiring a speed limit, inertial loads also require a limit on acceleration and deceleration to avoid excessive strain on the hydraulic circuit. If the servovalve is suddenly closed, the inertia of the load would still tend to force continued flow in the hydraulic circuits. This, of course, would put a strain on the hydraulic system. In order to avoid this, acceleration and deceleration rates would be set in the system according to the load intended to be controlled. Accordingly, there may be "internal settings" that would specify the rates desired.

If it were desired to stop an inertial system at whatever rate is consistent with the deceleration settings internally set, a "stop" signal could be sent to the system, and it would decelerate the load to a stop according to the internal settings. In contrast, it may occur that an emergency stop is desired. In such a case, an "abort" signal would be sent to the digital controller system, and the system would immediately shut the servovalve completely, regardless of the deceleration settings, and the resultant back pressure would have to be relieved by relief valves if damage to the hydraulic system is to be avoided. This would not be the preferred method of stopping the load, but it would be the fastest.

In addition to the acceleration and deceleration settings, another setting that might be set internally would be a "deadband" setting. This setting would determine how large the error between the desired position and the actual position would have to be before compensating action would be taken. The "acceleration," "deceleration," and "deadband" settings are described as "internal"; a practical system could well have these quantities set by thumbwheel switches, for instance, installed internal to the cabinet of the system since they would not be changed very often.

Two of the three remaining inputs and outputs shown in FIG. 5 have already been described. The pulses to the stepper motor have already been mentioned, as has the digital feedback signal from the encoder. The remaining signals, the outputs of the high and low limit switches, would be typical of an x-y table. Limit switches would typically be present at positions corresponding to either end of the table and would alert the controller to the fact that the edge of the table is being reached.

Figure 6:
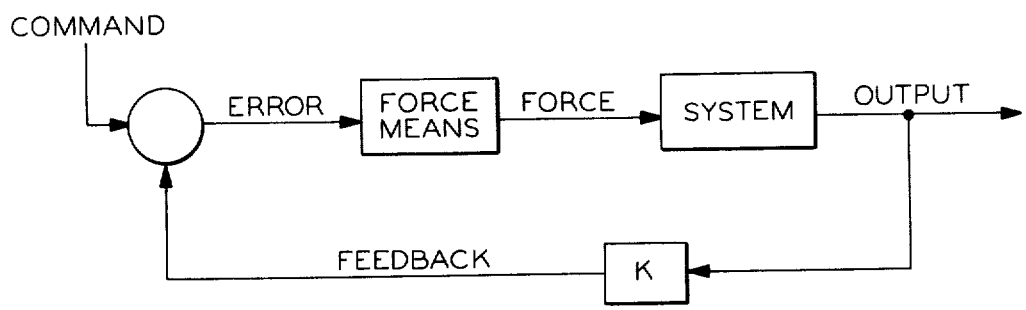
FIG. 6 is a block diagram that is representative of feedback control systems in general.

A feature that is of particular value in controllers of the type in which position is the controlled quantity can be understood by referring to FIG. 6. FIG. 6 shows a typical feedback control system, in which the difference is taken between a command and a feedback signal to produce an error signal, and a force is applied to the system in response to various functions of the error signal. The box labeled "K" represents the means for transforming the output into an appropriate feedback signal, and this block would be exemplified by encoder block 22 of FIG. 1 and encoder 62 of FIG. 2.

It is apparent from the diagram of FIG. 6 that it is desirable, at least in the static situation, for the force produced by the force means to be zero when the error, or difference between the command and output, is zero. In the apparatus of the present invention, this would mean that the servovalve should be completely closed when there is an indication of zero error. If the force applied by the force means in a zero-error situation is not zero, the system will be forced to move from the zero-error position so that there is enough error signal to return the force means to a zero-force output. Thus, there would be a static error in the system.

In hydraulic system that use servovalves of the type exemplified by the valve of FIGS. 3 and 4, this requirement that a zero error result in zero force on the system translates into a requirement that the particular rotational position of the spool set by the stepper motor when there is zero error always result in the translational position of the spool that permits no fluid flow through the valve. This requirement is met with some difficulty in prior-art systems because factors such as valve temperature and wear can cause the position of zero flow in the servovalve to vary somewhat. Accordingly, a fair proportion of the expense of manufacturing servovalves results from eliminating as much of this variation as appropriate manufacturing techniques make possible. Even with the added expense, though, variations can never be completely eliminated.

Figure 7:
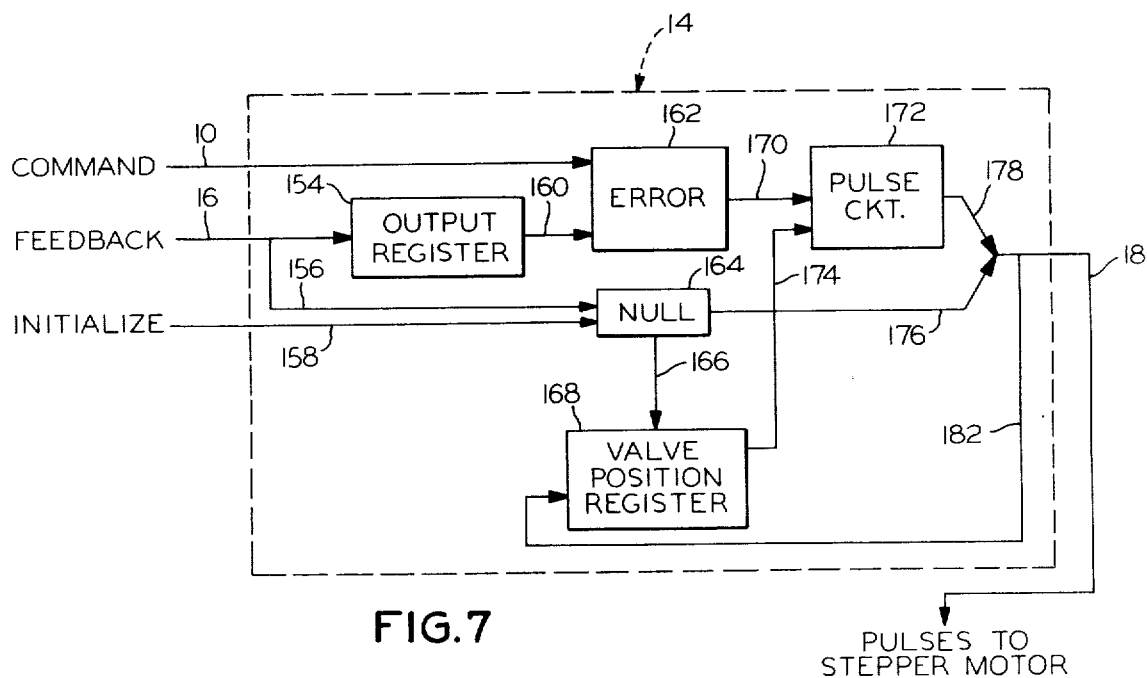
FIG. 7 is a block-diagram representation of the functions incorporated in the digital controller of the present invention.

The controller 14 (FIG. 1) of the present invention is arranged so that variation need not be totally eliminated by expensive manufacturing processes. As is illustrated in FIG. 7, the digital controller means of the present invention has a "floating null" feature. This feature keeps track of the particular spool position that results in zero hydraulic-fluid flow. As can be seen in FIG. 7, command and feedback signals are applied to the controller means on lines 10 and 16, respectively. The feedback signal on line 16 is typically in the form of pulses, each pulse representing a predetermined amount of change in output. An output register 154 determines the actual output by adding up the feedback pulses algebraically, and a digital signal that represents the actual output is present on line 160.

It is to be emphasized that FIG. 7 is meant to indicate the functions that would be carried out by a typical circuit, so the functions are segregated in a manner that lends itself to logical presentation. It is not necessary that the circuit components by which the functions are realized be so segregated. For instance, the block 162 that represents the function of computing the difference between the desired-output signal present on line 10 and the actual-output signal present on line 160 could quite conveniently be realized by an up/down counter that is incremented and decremented by command and feedback signals. In such an arrangement, the command signal would be a series of pulses that would represent the difference between the present desired output and the most recent desired output. The counter would therefore be "loaded" with the command signal, and the control system would operate to result in feedback pulses that increment or decrement the counter back to a zero position, including zero error. In such an arrangement, the functions represented by blocks 154 and 162 would both be realized in the same circuit. For purposes of explanation, however, the functions of determining the actual output and determining the error are segregated to comport with normal concepts of feedback control.

Block 172 represents the function of generating and applying signals to the stepper motor to cause it to position the valve operating member in response to the difference between the desired load output, represented by the signal on line 170, and the actual load output. If an error is indicated by the signal on line 170, a series of pulses is transmitted to the stepper motor to cause it to rotate the spool 88 and thereby slide it to permit hydraulic fluid to flow through the load in the direction that will reduce the error. Acceleration and deceleration curves will normally have been programmed into the controller along with a speed limit for the system, which represents the highest rate of flow that will be permitted in the system. If the error is large, the servovalve is opened according to the acceleration curve until it reaches the limit, and it is maintained the limit position until the error drops below a predetermined level that brings a deceleration curve into play. Pulses are then applied to the stepper motor to start to close the servovalve down in accordance with the deceleration curve.

It is desired that the servovalve reach its null position, in which no hydraulic fluid is allowed to flow, when the error reaches zero. In order to achieve this result, it is necessary to keep track of the position of the spool 88. This is accomplished by algebraically counting the pulses applied on line 18 to the stepper motor. A valve-postion register 168 receives the pulses applied to the stepper motor, as represented by line 182, and generates an output indicated by line 174 that thereby represents the translational position of the spool. By taking into account the position of the spool 88, the pulse circuit 172 determines the number of pulses required to move the spool to its proper position.

When the error represented by the signal on line 170 reaches zero, the pulse circuit 172 applies pulses to the stepper motor so as to increment or decrement the digital number contained in the valve-position register 168 to a predetermined null valve that represents the null position of the servovalve. As indicated before, however, the null position can occur at different rotational positions of the spool according to various factors such as temperature and wear. Accordingly, without some means of correction, the system of the present invention would be subject to the same difficulties as those normally encountered with other servovalve systems. However, the digital controller according to the present invention includes a nulling means represented by block 164 that is used to correct the controller so as to keep track of the current null position of the spool 88. The nulling means is operable through application of a signal on line 158 either generated internally or entered by an operator. The signal on line 158 causes nulling means 164 to monitor the feedback signals on line 156 and apply pulses to the stepper motor on line 176 until the changes indicated by the digital feedback signals on line 156 have stopped. When the digital feedback pulses stop, the nulling means 164 resets the position-representing digital number stored by the valve-position register 168 to the predetermined null value that indicates the null position of the spool 88. The nulling means thus adjusts the controller so that the number in the valve-position register correctly corresponds to actual valve position.

Without occasional nulling, the valve-position register 168 could contain something other than the predetermined null value when the spool 88 is actually in its null position. As a result, the pulse circuit 172 would in some instances receive information that the valve is completely closed when it actually is not. This would be undesirable, of course, so the nulling means 164 is used to reset the valve-position register to cause the null value of the position-representing digital number to correspond to the null position of the spool 88.

Figure 8:
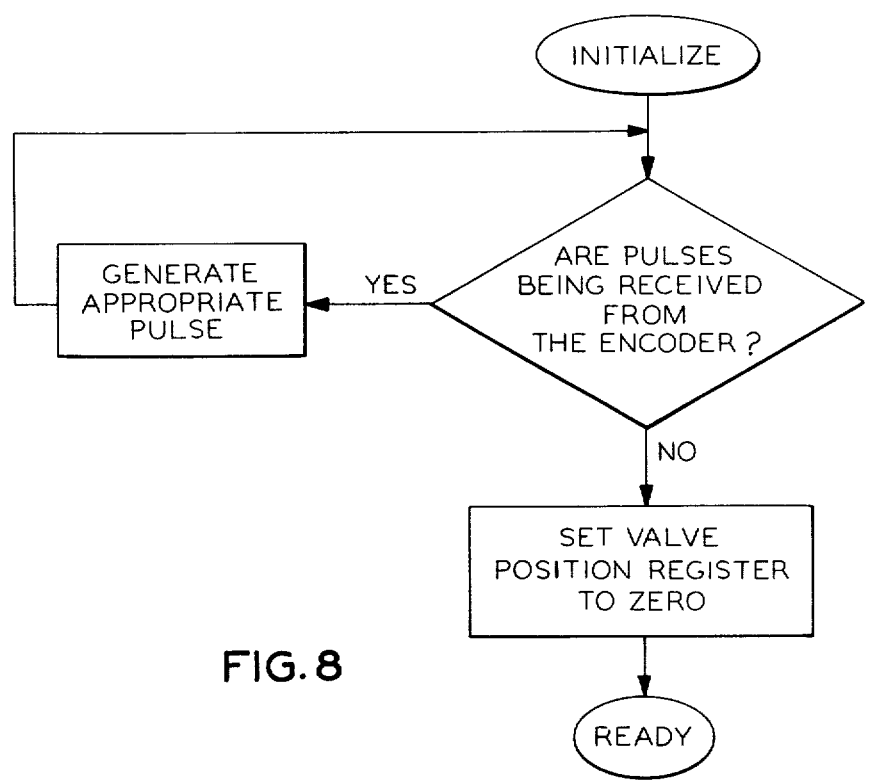
FIG. 8 is a flow chart that demonstrates the operation of the nulling means incorporated in the digital controller of the present invention.

The function of the nulling means is illustrated in flow-chart form in FIG. 8. There it is shown that an initialization signal causes the nulling means to determine whether any pulses are being received from the encoder. If they are, the output is changing, so the servovalve is not in its null position. The nulling means therefore generates a pulse appropriate for reducing flow in the valve. Once the pulse has been sent, it is again determined whether pulses are being received from the encoder, and if they are still being received, an appropriate pulse is generated as before. When the pulses stop, the servovalve is in its null position, and the position-representing digital number in the valve-position register is reset to the predetermined null value, typically zero. The controller is then ready for normal operation, and the nulling means 164 generates no more pulses until a signal on line 158 again calls on it to initialize the system.

It can be seen that provision of a nulling means permits somewhat greater tolerances to be employed in the manufacture of the servovalve because variations, though not desired, can easily be taken into account by the circuitry of the control system. Thus, the servovalve can always be accurately nulled even if variations occur. The nulling means is particularly advantageous in the context of the present invention, which is an all-digital control system. The feedback signal, the command signal, all signals in the digital controller means, and the signals to the stepper motor are all digital, resulting in the repeatability normally associated with digital systems. The nulling means illustrated above enhances this repeatability by compensating for the variability of the one inherently analog part of the system, the servovalve.

Having thus described the invention, I claim:

1. In a digital feedback control system for controlling a load whose output is controllable by flow of fluid therethrough, the combination comprising:

a. servovalve means including a valve operating member movable therewithin;

b. fluid circuit means adapted for connection between a source of pressurized fluid and said servovalve means and between said servovalve means and the load, for providing fluid communication between the source of pressurized fluid and said servovalve means and between said servovalve means and the load, the rate and direction of fluid flow through said servovalve means and thereby through the load being dependent on the position of said operating member in said servovalve means said valve operating member being movable to a null position in which it prevents fluid flow in said servovalve;

c. stepper motor means operatively connected to said valve operating member to change the position of said valve operating member by steps in response to pulses applied to said stepper motor means;

d. digital feedback means adapted to be connected to the fluid-controlled load to sense changes in the output of the load and generate digital feedback signals indicative of changes in the load output; and e. digital controller means, adapted to be connected to a source of digital command signals indicative of a desired load output, and connected to said digital feedback means for reception of the digital feedback signals, for determining the actual load output from the feedback signals, comparing the actual load output with the desired load output, and generating and applying to said stepper motor means signals to position said valve operating member, in response to the difference between the actual load output and the desired load output, for flow of fluid through the load to reduce the difference between the actual load output and the desired load output, said digital controller means including position-storing means for storing a digital number, monitoring the step signals generated and applied to said stepper motor means by said digital controller means, and incrementing and decrementing the digital number in accordance with the signals applied to said stepper motor means by said digital controller means, the position of said valve operating member being represented by the digital number, a predetermined null valve of the digital number representing the null position of said servovalve, said digital controller means further including nulling means operable to monitor the digital feedback signals received by said digital controller means, to generate and apply to said stepper motor means signals for positioning said valve operating member to counter any changes in output indicated by said digital feedback signals, and to reset the position-representing digital number to the predetermined null value when no further changes in output are indicated by the feedback signals, said digital controller means generating and applying to said stepper motor means signals to cause said position-storing means to increment or decrement said stored digital number to equal the predetermined null value when the desired load output equals the actual load output, fluid flow in said fluid circuit means thereby being prevented when the actual and desired load outputs are equal.

2. The combination of claim 1, wherein said stepper motor means includes an output shaft and is operable, by application of pulses to it, to rotate said shaft in controlled steps, each step representing a controlled number of degrees of arc, and said servovalve means includes:
  a. a valve body having a valve chamber and a chamber wall bounding said valve chamber, at least one inlet port communicating with said chamber, and at least two control outlet ports communicating with said chamber and spaced along said chamber from said inlet port;
  b. a valve spool slidably and rotatably mounted axially of said chamber and having lands contiguous to said chamber walls to regulate flow of fluid in said valve chamber between said inlet port and said control ports;
  c. rotary-to-linear-translator means at one end of said valve spool including a first element on said valve spool for movement therewith and a second element fixedly disposed in said valve body, rotation of said valve spool and thereby of said first element relative to said second element producing concurrent relative axial movement thereof and thereby of said valve spool relative to said ports; and
  d. coupling means, connected between said stepper-motor-means output shaft and the other end of said valve spool, for coupling rotation of said shaft to said spool while permitting relative sliding movement of the other end of said spool relative to said shaft, application of pulses to said stepper motor means thereby causing said spool to be rotated and slid in steps relative to said valve body and thereby also causing said chamber walls to be wiped by rotation of said lands.

3. The combination of claim 2 wherein one of said first and second elements of said rotary-to-linear-translator means includes a cylindrical member coaxial with said spool and having a helical groove, and the other of said first and second elements of said rotary-to-linear-translator means includes a cam pin extending into said groove, rotation of said valve spool relative to said valve body causing relative movement of said cam pin and said helical groove to slide said valve spool axially of said valve body.

4. The combination of claim 3 wherein said first element of said rotary-to-linear-translator means includes said cylindrical member with said helical groove, and said second element of said rotary-to-linear-translator means includes said cam pin.

5. The combination of claim 2, 3, or 4 wherein said valve body also has at least two return ports, one associated with each of said control ports, each of said return ports communicating with said chamber and spaced along said chamber from its associated control port, said lands on said valve spool regulating flow of fluid in said valve chamber from said return ports to their associated control ports.

6. A method of nulling a digital feedback control system for controlling a load whose output is controllable by flow of fluid therethrough, the control system including servovalve means having a valve operating member movable therewithin, fluid circuit means, adapted for connection between a source of pressurized fluid and said servovalve means and between said servovalve means and the load, for providing fluid communication between the source of pressurized fluid and said servovalve means and between said servovalve means and the load, the rate and direction of fluid flow through said servovalve means and thereby through the load being dependent on the position of said operating member in said servovalve means, stepper motor means operatively connected to said valve operating member to change the position of said valve operating member by steps in response to pulses applied to said stepper motor means, digital feedback means, and digital controller means, said servovalve means having a null position in which it prevents fluid flow in said servovalve, said digital controller means including position-storing means for storing a digital number, monitoring the step signals generated and applied to the stepper motor means by said digital controller means, and incrementing and decrementing the digital number in accordance with the signals applied to said stepper motor means by said digital controller means, the position of said valve operating member being represented by the digital number, a predetermined null value of the digital number representing the null position of said servovalve, said digital controller means generating and applying to said stepper motor means the step signals required to cause said position-storing means to increment or decrement said stored digital number to equal said predetermined null value when the desired load output equals the determined load output, comprising the steps of:
  a. monitoring the digital feedback signals received by said digital controller means to detect any changes in output indicated by the digital feedback signals;
  b. generating and applying to said stepper motor means step signals for positioning said servovalve means to counter any changes in output indicated by the digital feedback signals; and
  c. resetting the position-representing digital number to the predetermined null value when no further changes in output are indicated by the feedback signals, thereby insuring correspondence at the null position of said servovalve between the digital number and the null position of said servovalve.

* * * * *